(12) United States Patent
Milnar et al.

(10) Patent No.: US 6,648,393 B1
(45) Date of Patent: Nov. 18, 2003

(54) LATERAL SLIDING SEAT

(75) Inventors: James B Milnar, St. Clair Shores, MI (US); Timothy N Boundy, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/321,891

(22) Filed: Dec. 17, 2002

(51) Int. Cl.[7] .................................................. B60N 2/02
(52) U.S. Cl. .................................. 296/65.11; 296/65.03
(58) Field of Search ........................ 296/65.11, 65.12, 296/65.13, 65.03; 297/344.1; 248/503.1

(56) References Cited

U.S. PATENT DOCUMENTS

| | | | |
|---|---|---|---|
| 5,498,051 A | 3/1996 | Sponsler et al. | 296/65.1 |
| 5,671,965 A | 9/1997 | O'Connor | 296/65.1 |
| 5,961,183 A | 10/1999 | Smith et al. | 297/322 |
| 6,135,555 A | 10/2000 | Liu et al. | 297/336 |
| 6,179,363 B1 | 1/2001 | Palajac et al. | 296/65.03 |
| 6,220,665 B1 | 4/2001 | Dingel et al. | 297/326 |
| 6,286,886 B1 * | 9/2001 | Odagaki | 296/65.11 |
| 6,375,246 B1 | 4/2002 | Nicola et al. | 296/65.03 |

* cited by examiner

*Primary Examiner*—Joseph D. Pape
(74) *Attorney, Agent, or Firm*—Laura C. Hargitt

(57) ABSTRACT

A vehicle seat assembly includes first and second rails configured for mounting transversely on a vehicle floor, parallel to each other. A seat includes rear and front supports with rollers configured for rolling engagement with the first and second rails, respectively, to facilitate lateral movement of the seat across the rails. The rear supports have a releasable rear clamping mechanism engageable with the first rail and releasable from the first rail to enable tumbling of the seat forward in the vehicle. The front supports include a releasable front clamping mechanism engageable with the second rail and releasable from the second rail to enable removal of the seat from the vehicle after tumbling. The seat is laterally movable across the rails when the front and rear clamping mechanisms are simultaneously at least partially released.

22 Claims, 13 Drawing Sheets

LATERAL SLIDING SEAT

TECHNICAL FIELD

The present invention relates to a lateral sliding seat which is also configured to fold, tumble and be removed from a vehicle.

BACKGROUND OF THE INVENTION

Vehicle interior designers continuously strive to increase and improve functionality and convenience of vehicle seat assemblies. The prior art includes vehicle seat assemblies which may fold, tumble and be removed from the vehicle to provide additional usable storage space within the vehicle. Examples of such seats are illustrated in U.S. Pat. Nos. 6,375,246; 6,179,363; and 6,135,555.

Many vehicles include three rows of seats, with side doors adjacent the second row of seats. Some such three-row designs may result in difficult ingress and egress for passengers entering and exiting the third row seats through the side doors of the vehicle.

SUMMARY OF THE INVENTION

The present invention provides an improved vehicle seat assembly which includes folding, tumbling and removal capability, and is also laterally slidable across a vehicle floor by rollers which roll across rails mounted on the vehicle floor.

More specifically, the invention provides a vehicle seat assembly including first and second rails configured for mounting transversely on a vehicle floor parallel to each other, and a seat having front and rear supports with rollers configured for rolling engagement with the first and second rails, respectively, to facilitate lateral movement of the seat across the rails. The rear supports include a releasable rear clamping mechanism engageable with the first rail and releasable from the first rail to enable tumbling of the seat forward in the vehicle. The front supports include a releasable front clamping mechanism engageable with the second rail and releasable from the second rail to enable removal of the seat from the vehicle after tumbling. The seat is laterally movable across the rails when the front and rear clamping mechanisms are simultaneously at least partially released.

The first and second rails include a plurality of spaced-apart apertures formed therethrough, and the front and rear clamping mechanisms include hooks releasably engageable with the apertures. A single release lever is operatively connected to the front and rear clamping mechanisms to facilitate release for lateral sliding movement of the seat across the rails.

The second rail includes an enlarged cylindrical portion engageable with the rollers of the front supports. A linkage is operatively connected between the release lever and the front clamping mechanism. The linkage is configured to partially release the front clamping mechanism sufficiently to enable sliding movement of the seat but not sufficiently to provide clearance for the clamping mechanism to pass over the enlarged portion of the second rail to enable removal of the seat from the rail. A front release lever is connected to the front clamping mechanism to selectively fully release the front clamping mechanism to enable the clamping mechanism to pass over the enlarged portion of the second rail to enable removal of the seat from the second rail.

Release of the rear clamping mechanism enables the seat to tumble forward, assisted by at least one spring. The rear clamping mechanism may be fully released by rotating the single release lever, or by actuating a rear strap or rear release bar.

The seat includes a lower seat and a seatback pivotally connected to the lower seat. The seatback is pivotable to a folded position on the lower seat.

First and second plastic trim pieces are supported on the vehicle floor. The first and second rails protrude through the first and second trim pieces, respectively, and the trim pieces surround the first and second rails.

A second seat is constructed as described above, and operatively slidable across the first and second rails.

Accordingly, a second row seat in a minivan or sport-utility vehicle may be slid out of the way without entering a vehicle in order to gain access to a third row seat. The seat need not be folded, tumbled or removed to gain access to the third row seat. The seated occupant may also laterally adjust the seat in the vehicle while seated when the vehicle is parked.

The above objects, features, advantages, and other objects, features, and advantages of the present invention are readily apparent from the following detailed description of the best mode for carrying out the invention when taken in connection with the accompanying drawings.

DESCRIPTION OF THE PREFERRED EMBODIMENTS

Figure 1:
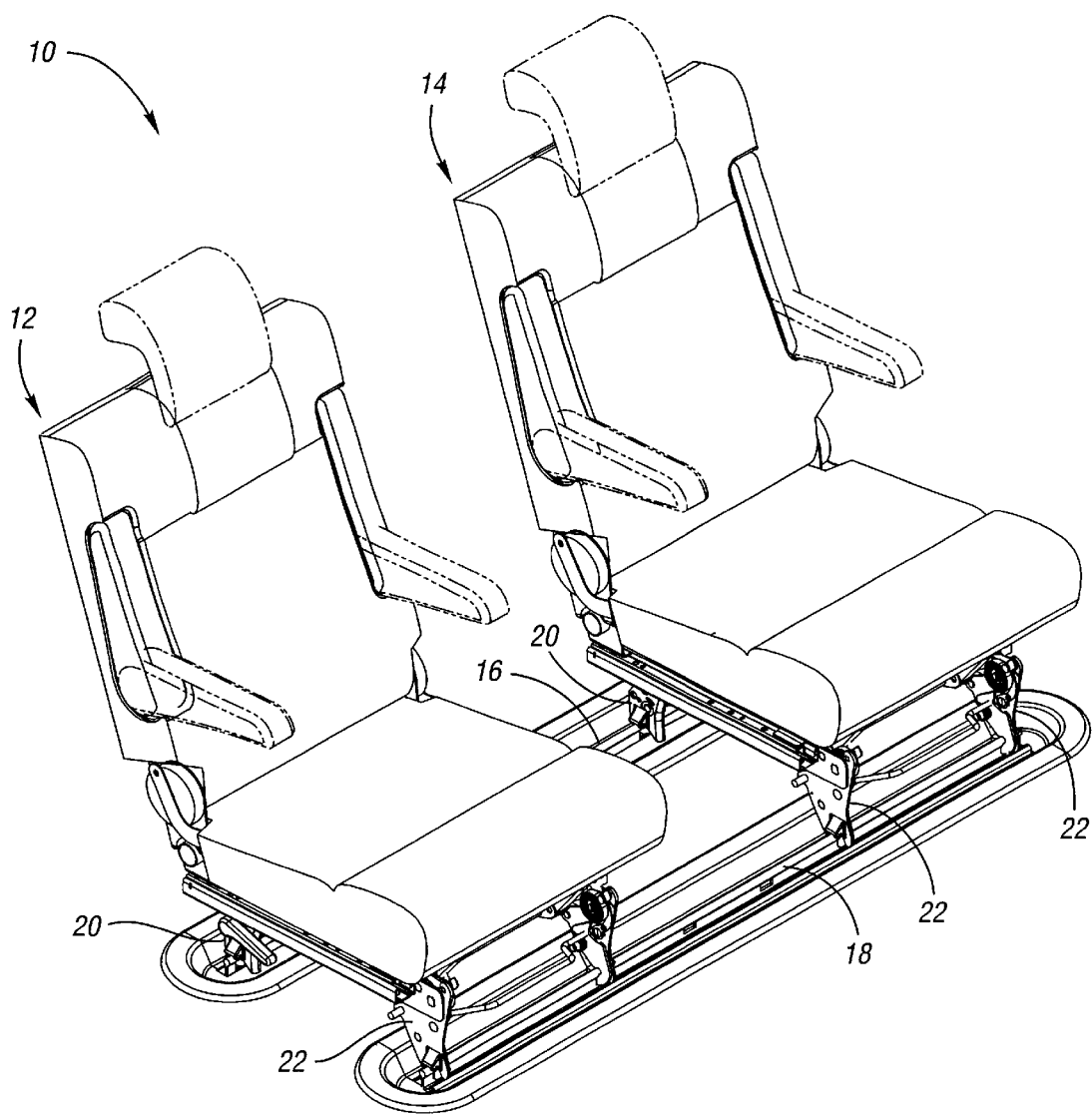
FIG. 1 shows a front perspective view of a seat assembly in accordance with an embodiment of the invention.
Figure 2:
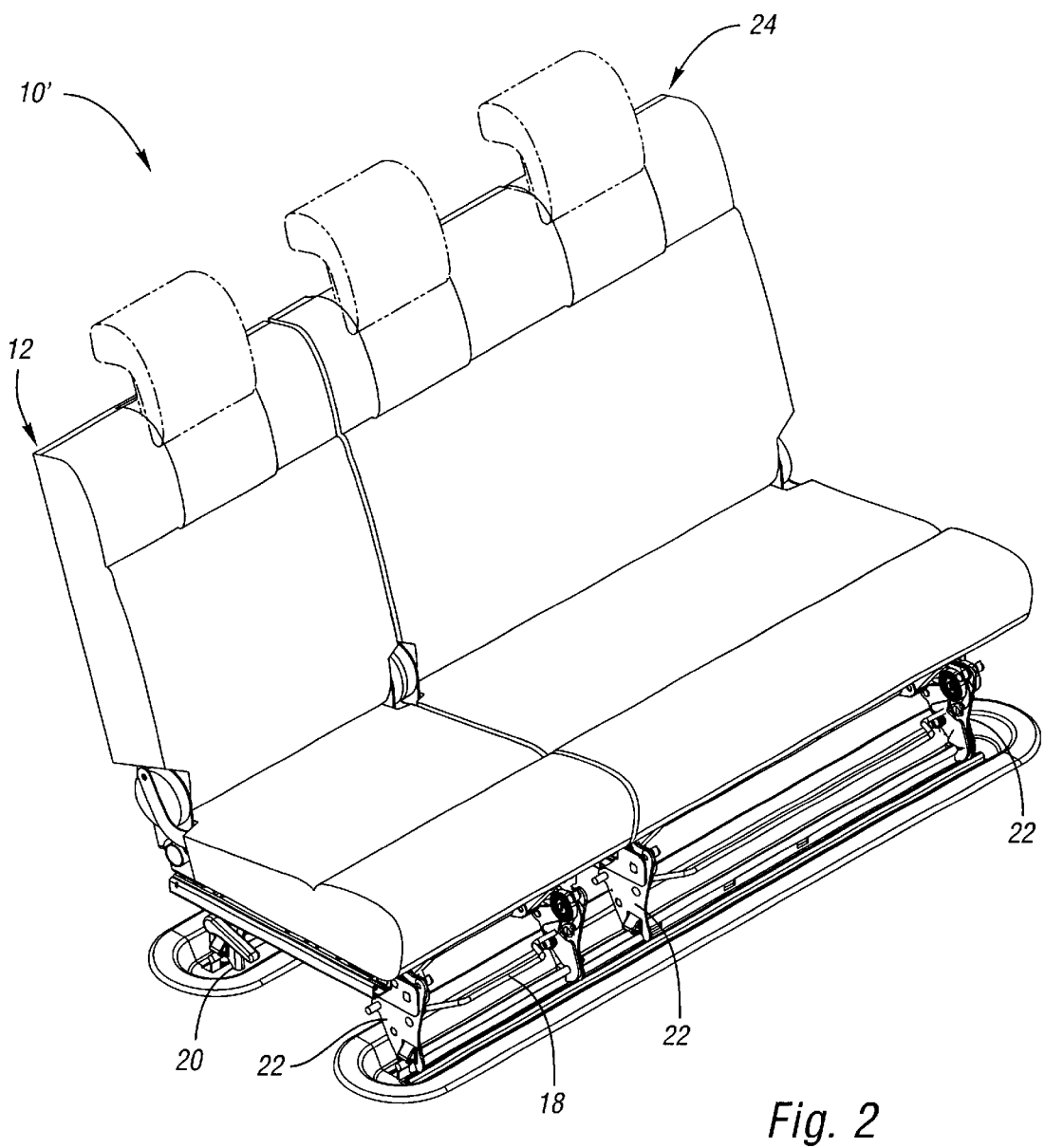
FIG. 2 shows a front perspective view of a seat assembly in accordance with an alternative embodiment of the invention.
Figure 3:
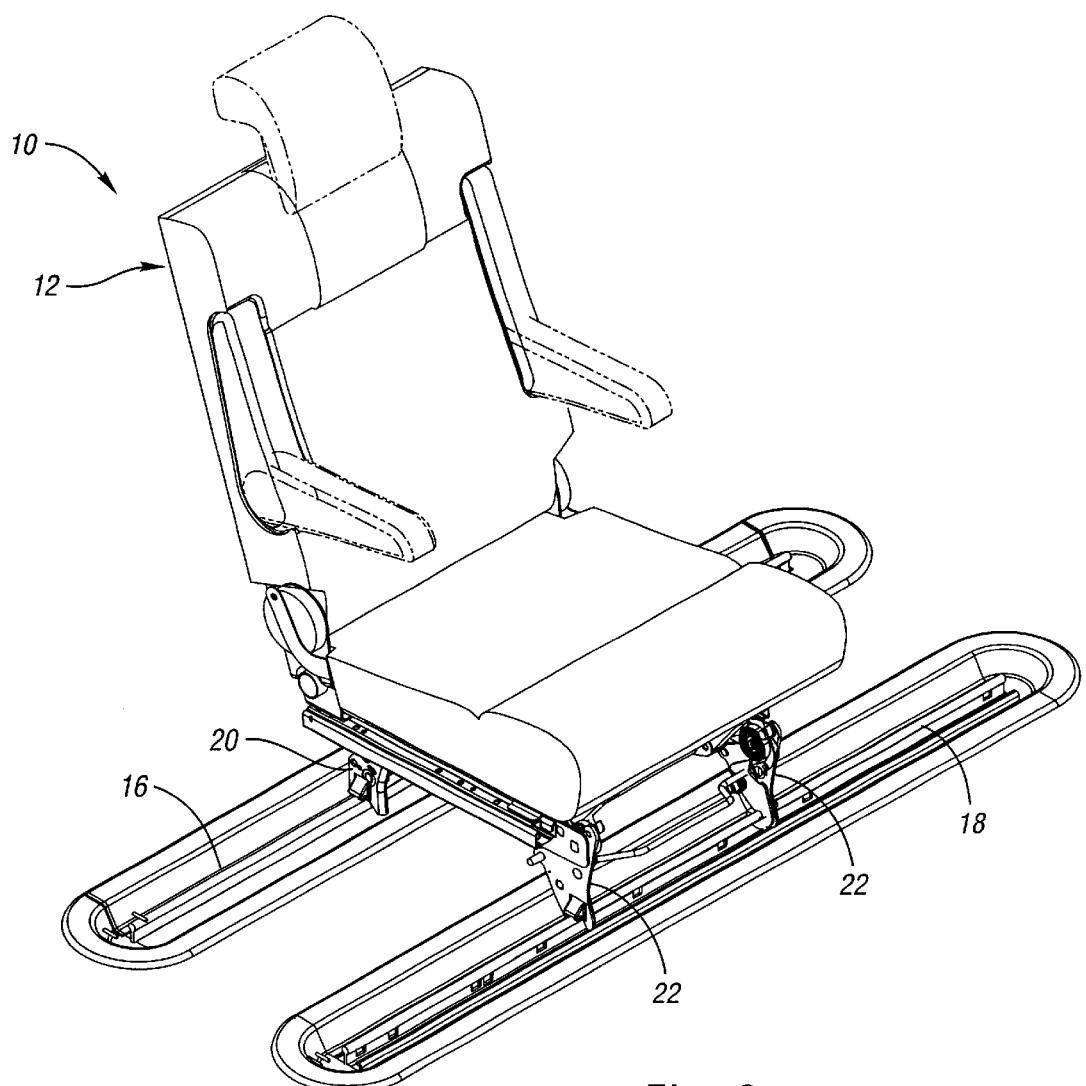
FIG. 3 shows a front perspective view of the seat assembly of FIG. 1, with one of the seats removed.

Vehicle seat assemblies 10, 10' are shown in FIGS. 1–3. The assembly shown in FIG. 1 includes first and second seats 12, 14 which are supported on first and second rails 16, 18. The first and second rails 16, 18 are mounted transversely on a vehicle floor parallel to each other, as illustrated.

Each seat 12, 14 includes rear and front supports 20, 22 configured for rolling engagement with the first and second rails 16, 18, respectively, to facilitate lateral sliding movement of the seats 12, 14 across the rails 16,18.

The seats 12, 14 may be folded, tumbled forward, slid laterally across the rails 16, 18, or removed from the vehicle. In the configuration of FIG. 3, the seat 14 of FIG. 1 has been removed from the rails 16, 18, and the seat 12 has been slid over to the center of the rails 16, 18, thereby improving access to the rear or third row seats of the vehicle.

FIG. 2 shows an alternative embodiment wherein the seat 14 of FIG. 1 has been replaced by the seat 24, wherein the seat 24 and seat 12 take up approximately 60% and 40%, respectively, of the length of the rails 16, 18. The seat 24 is configured with the same roller-mounted rear and front supports 20, 22 described with reference to FIGS. 1 and 2.

Figure 4:
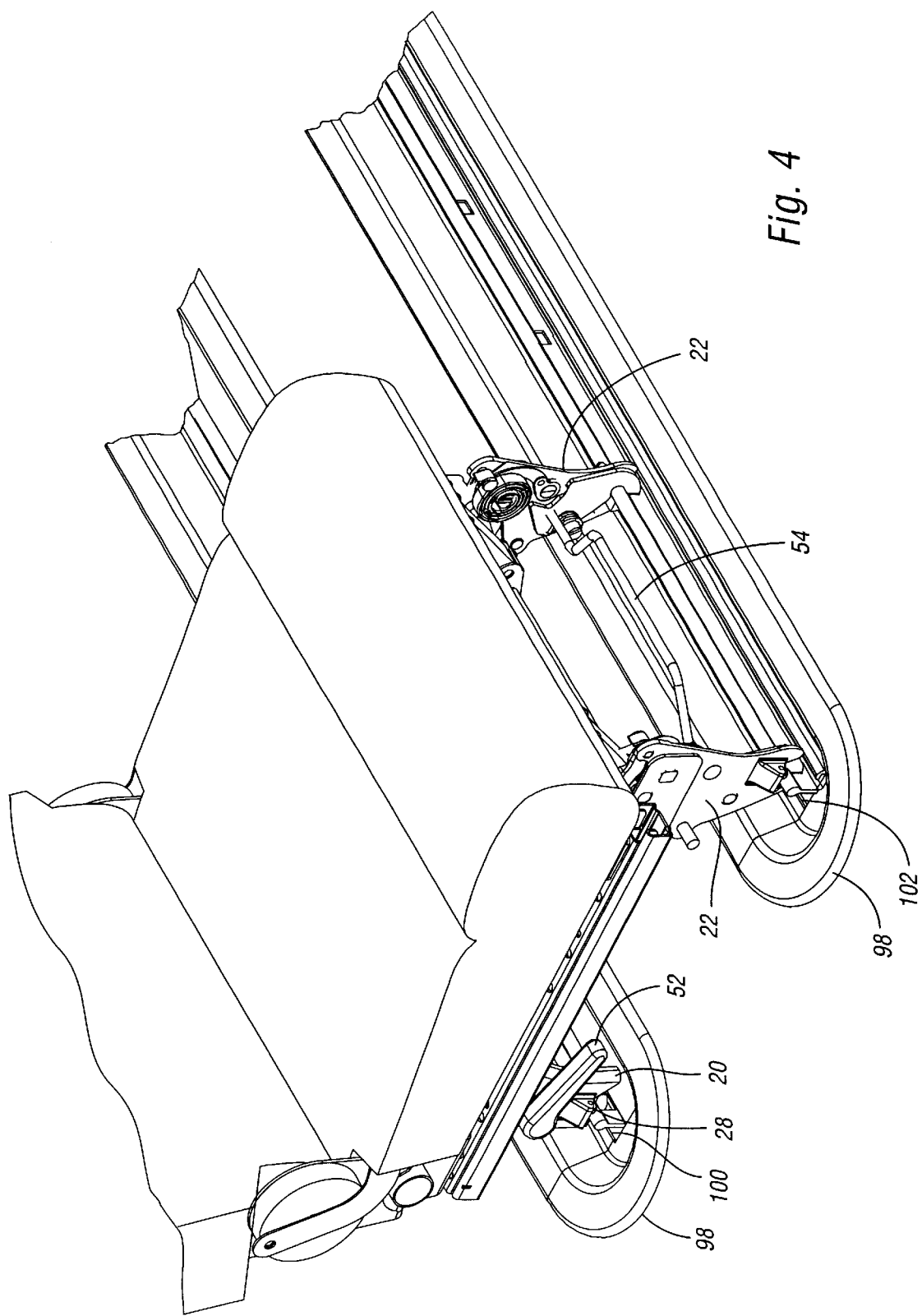
FIG. 4 shows a close-up perspective view of the seat assembly of FIG. 3.
Figure 5:
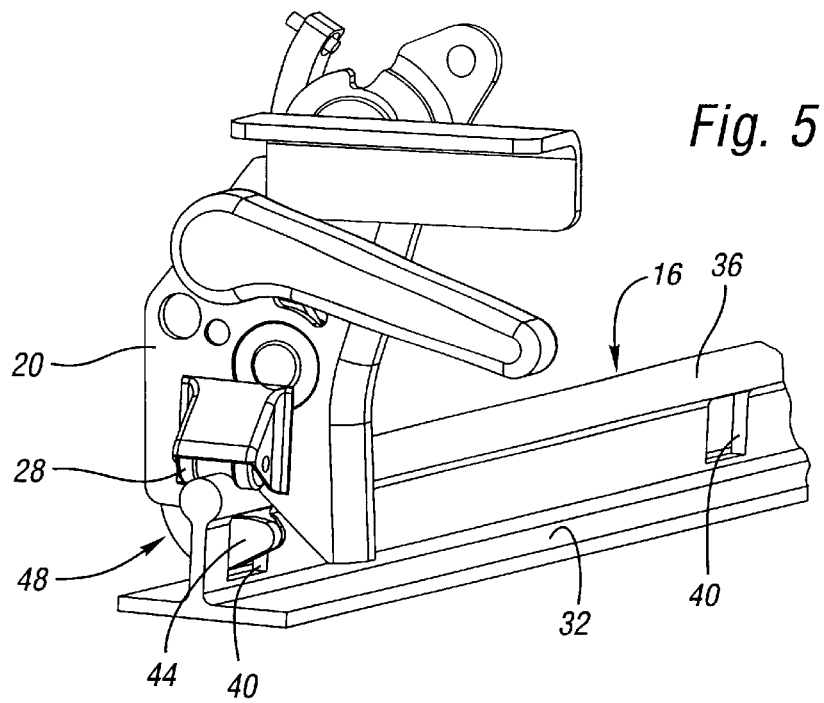
FIG. 5 shows a partial perspective view of a rear seat support, roller and rail in accordance with the embodiment of FIG. 3.
Figure 6:
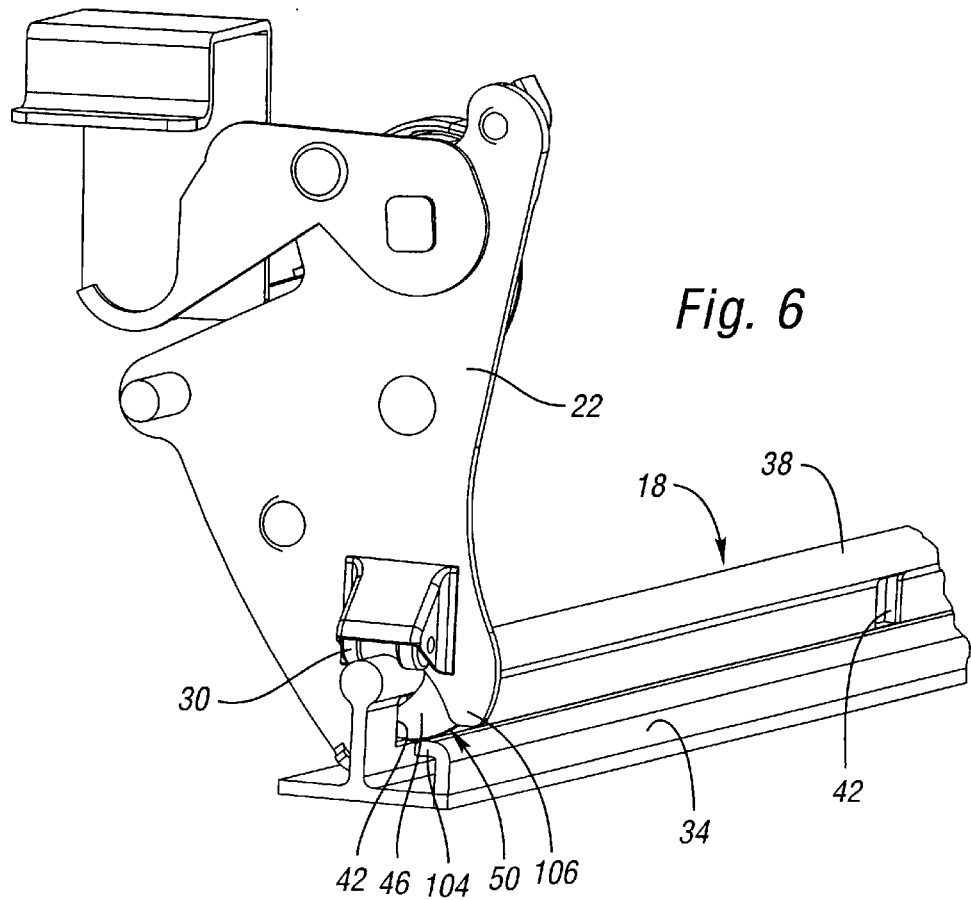
FIG. 6 shows a partial perspective view of a front support, roller and rail in accordance with the embodiment of FIG. 3.
Figure 7:
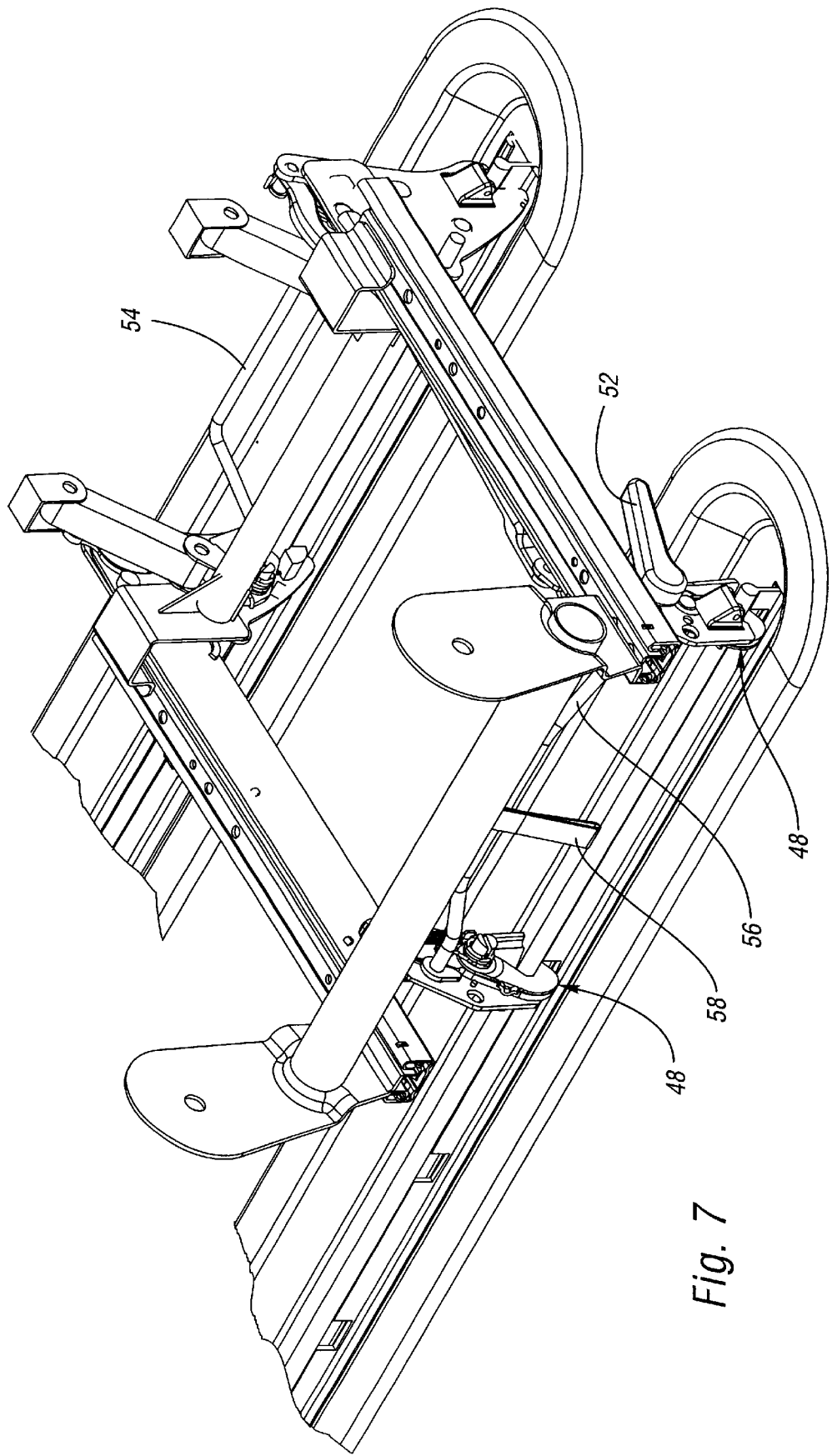
FIG. 7 shows a partially disassembled rear perspective view of the seat assembly of FIG. 3.
Figure 8:
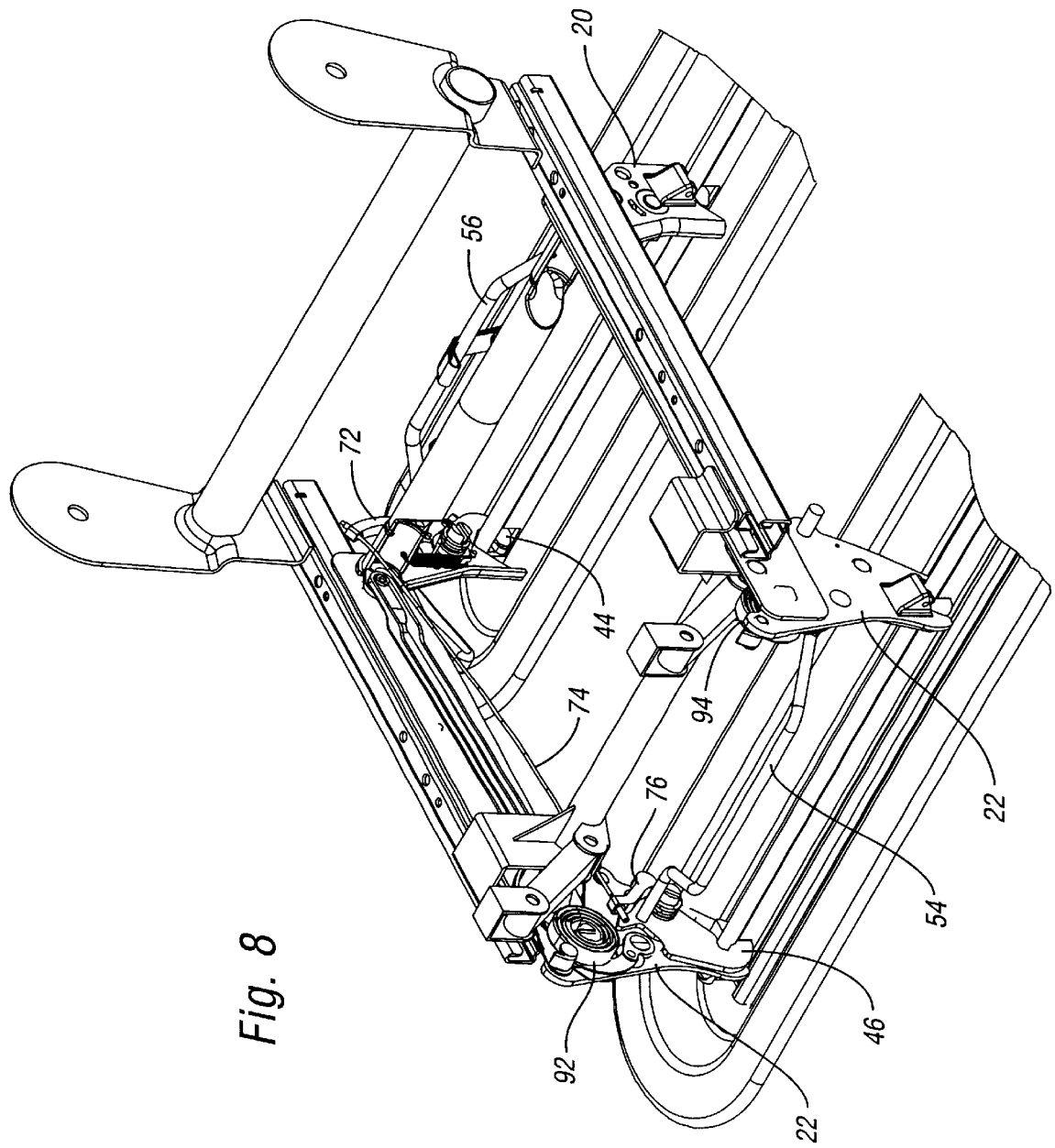
FIG. 8 shows a partially disassembled front perspective view of the seat assembly of FIG. 3.

As shown in FIGS. 4–6, the rear and front supports 20, 22 are mounted on the rails 16, 18 by the rollers 28, 30. The rollers 28, 30 are preferably hard rubber components to reduce vibration-induced noise. The roller mechanisms 28, 30 are configured to minimize noise and to allow controlled sliding so that the effort to slide is extremely low for the user.

As shown most clearly in FIGS. 5 and 6, the rails 16, 18 each include a lower portion 32, 34 which is configured for mounting to the vehicle floor, and an enlarged cylindrical upper portion 36, 38 which is rounded to receive the rollers 28, 30.

The rails 16, 18 also include a plurality of spaced-apart apertures 40, 42, which are configured to receive the hook portions 44, 46, respectively, of the rear and front clamping mechanisms 48, 50 to lock the seat(s) in a desired lateral position.

The rear clamping mechanism 48 and the front clamping mechanism 50 may be at least partially disengaged by the single release lever 52, shown in FIG. 4. The front clamping mechanism 50 may be fully released by actuating the front release bar 54.

Figure 9:
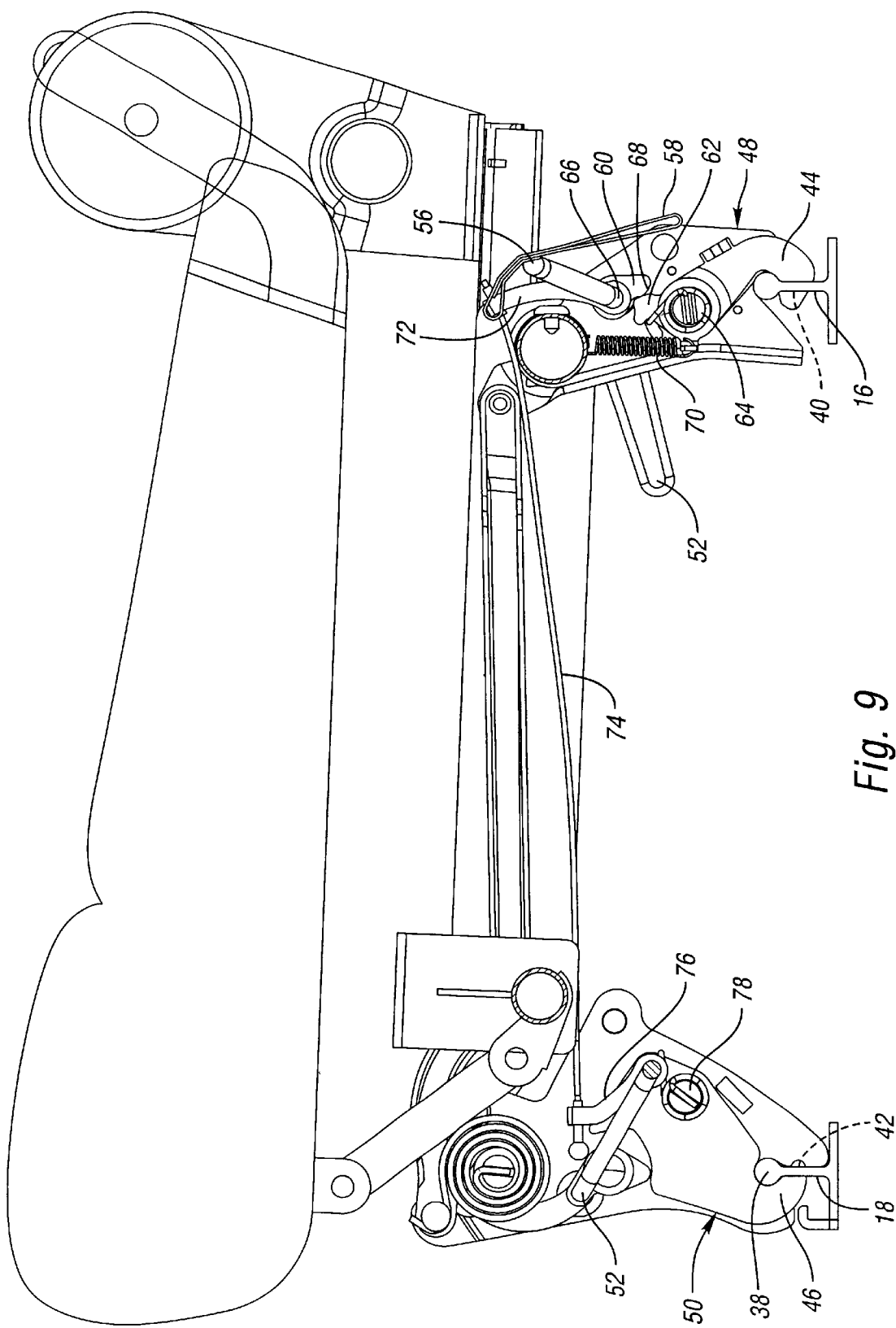
FIG. 9 shows a partial interior side view illustrating front and rear clamping mechanisms of the seat assembly of FIG. 3.

The structure and function of the rear and front clamping mechanisms 48, 50, and the associated operational structure is most clearly seen in FIGS. 7–10. In order to release the hook portion 44 of the rear clamping mechanism 48, the single release lever 52, rear release bar 56, or rear strap 58 may be pulled to pivot the first link 60 toward the link portion 62 of the hook portion 44 to pivot the hook portion 44 about the pivot axis 64, as shown in FIG. 9, to withdraw the hook portion 44 from the aperture 40 of the first rail 16. More specifically, pivotal movement of the single release lever 52 or rear release bar 56 causes pivotal movement of the first link 60 about its pivot axis 66 so that the cam surface 68 of the first link 60 engages a corresponding cam surface on the link portion 62 of the hook portion 44 to cause pivotal movement of the hook portion 44 about the pivot axis 64 to withdraw the hook portion 44 from the aperture 40 against the bias of the spring 70. Accordingly, the rear clamping mechanism 48 may be fully released by actuating the single release lever 52, rear release bar 56, or rear strap 58 to enable sliding movement of the seat across the rails, or for tumbling the seat forward.

As shown in FIG. 9, the single release lever 52 is also connected through a connector 72 to a link mechanism 74 and to the front connector 76, which is engaged with the front clamping mechanism 50. Therefore, pivotal movement of the single release lever pivots the connector 72, which pulls the link mechanism 74 to the right, as viewed in FIG. 9, which pivots the front connector 76, thereby rotating the hook portion 46 of the front clamping mechanism 50 about the pivot axis 78 to withdraw the hook portion 46 from the aperture 42 of the second rail 18. By using the single release lever 52 in this manner, the hook portion 46 is only sufficiently withdrawn from the aperture 42 to allow sliding movement of the seat across the rails 16, 18, but not sufficiently to retract the hook portion 46 enough to pass over the enlarged cylindrical upper portion 38 of the second rail 18 for removing the seat from the vehicle. The actuation of the rear and front clamping mechanisms 48, 50 by the single release lever 52 to a released position sufficient for sliding the seat across the rails 16, 18 is illustrated in FIG. 10, with the clamped position shown in phantom.

Figure 10:
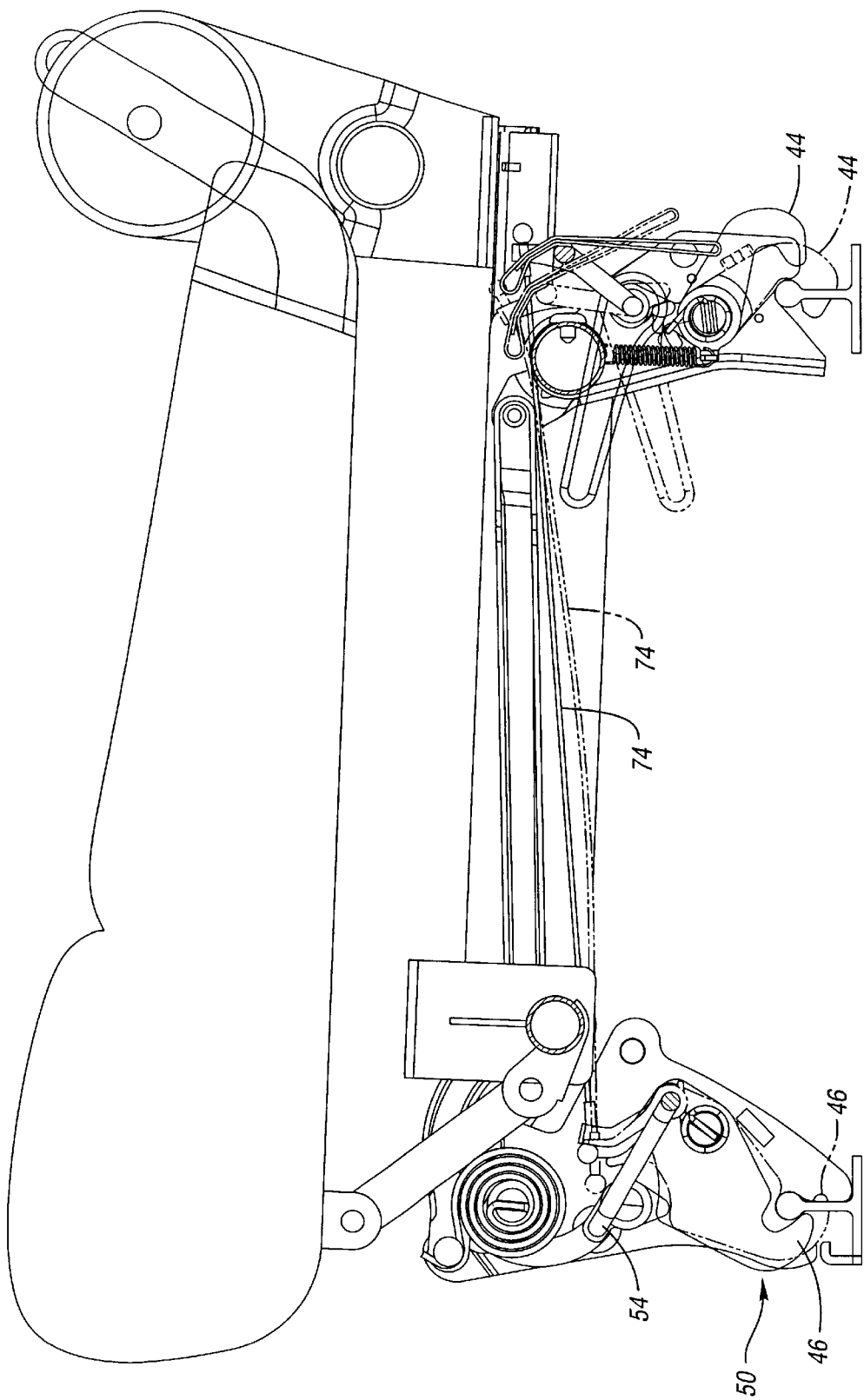
FIG. 10 shows the partial interior side view of FIG. 9 with the clamping mechanisms in the released position with the clamped position in phantom.

In order to pivot the hook portion 46 of the front clamping mechanism 50 further from the position shown in FIG. 10 to a fully released position, the front release bar 54 must be rotated to further rotate the hook portion 46 about the pivot axis 78 to a position sufficiently retracted to enable the hook portion 46 to pass over the enlarged portion 38 of the second rail 18 to remove the seat from the vehicle.

Accordingly, the seat 12 may be slid laterally across the vehicle to improve access to the third row seats of the vehicle by simply disengaging the rear and front clamping mechanisms 48, 50, sliding the seat assembly by virtue of engagement of the rollers 28, 30 with the rails 16, 18, across the rails 16, 18, and engaging the rear and front clamping mechanisms 48, 50 in a different set of apertures 40, 42 at a different location along the first and second rails 16, 18.

Figure 11:
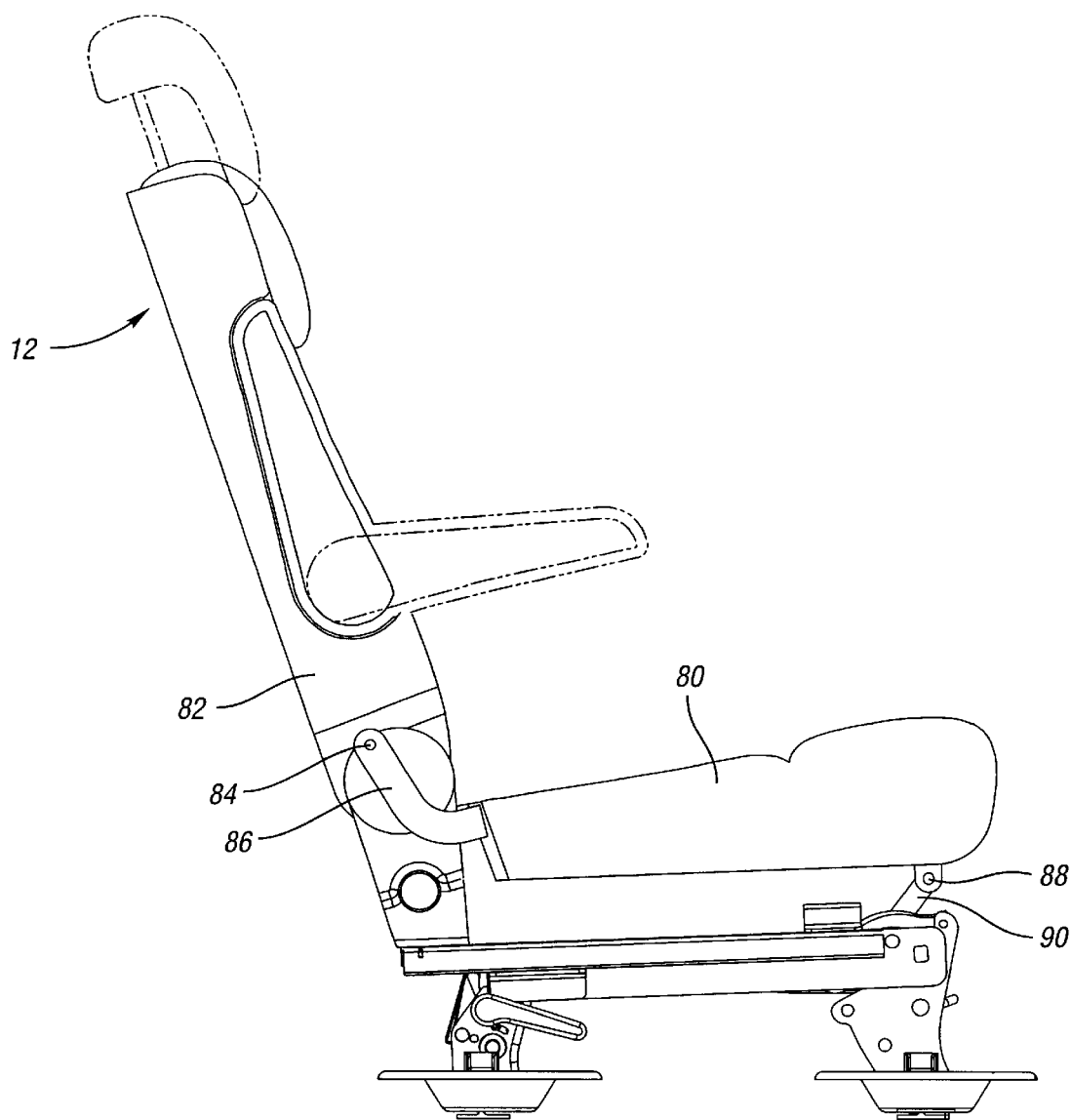
FIG. 11 shows a side view of the seat assembly of FIG. 3 in the upright position.

The sequence of operation for folding, tumbling, and removing the seat 12 from the vehicle is shown in FIGS. 11–14. As shown in FIG. 11, the seat assembly 12 includes a lower seat 80 and a seatback 82. In order to fold the seat assembly 12 to the folded position shown in FIG. 12, the seatback 82 is pivoted downward toward the lower seat 80. As the seatback 82 is pivoted downward, the pin 84 on the link 86 and the pin 88 on the link 90 translate forward and downward, thereby moving the lower seat 80 forward and downward to lower the collapsed height of the folded seat assembly, shown in FIG. 12. In order to release the seatback 82 for pivotal movement from the position shown in FIG. 11 to the folded position shown in FIG. 12, a recliner mechanism (not shown) is actuated.

Figure 12:
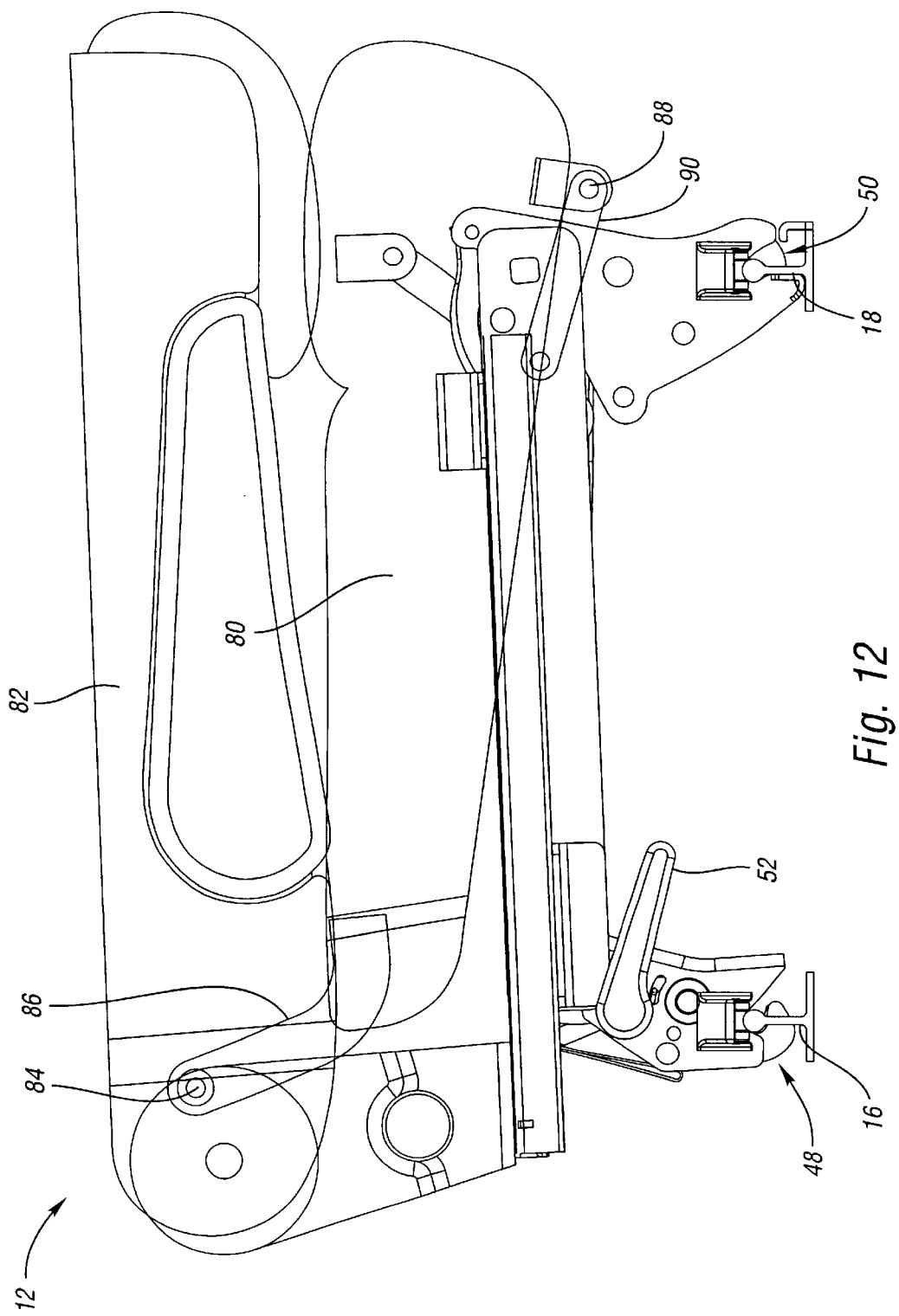
FIG. 12 shows a side view of the seat assembly of FIG. 11 in the folded position.

In the folded position shown in FIG. 12, the seat assembly 12 may be slid laterally across the rails 16, 18 by engaging the single release lever 52 so that the rollers 28, 30 may roll across the first and second rails 16, 18.

Figure 13:
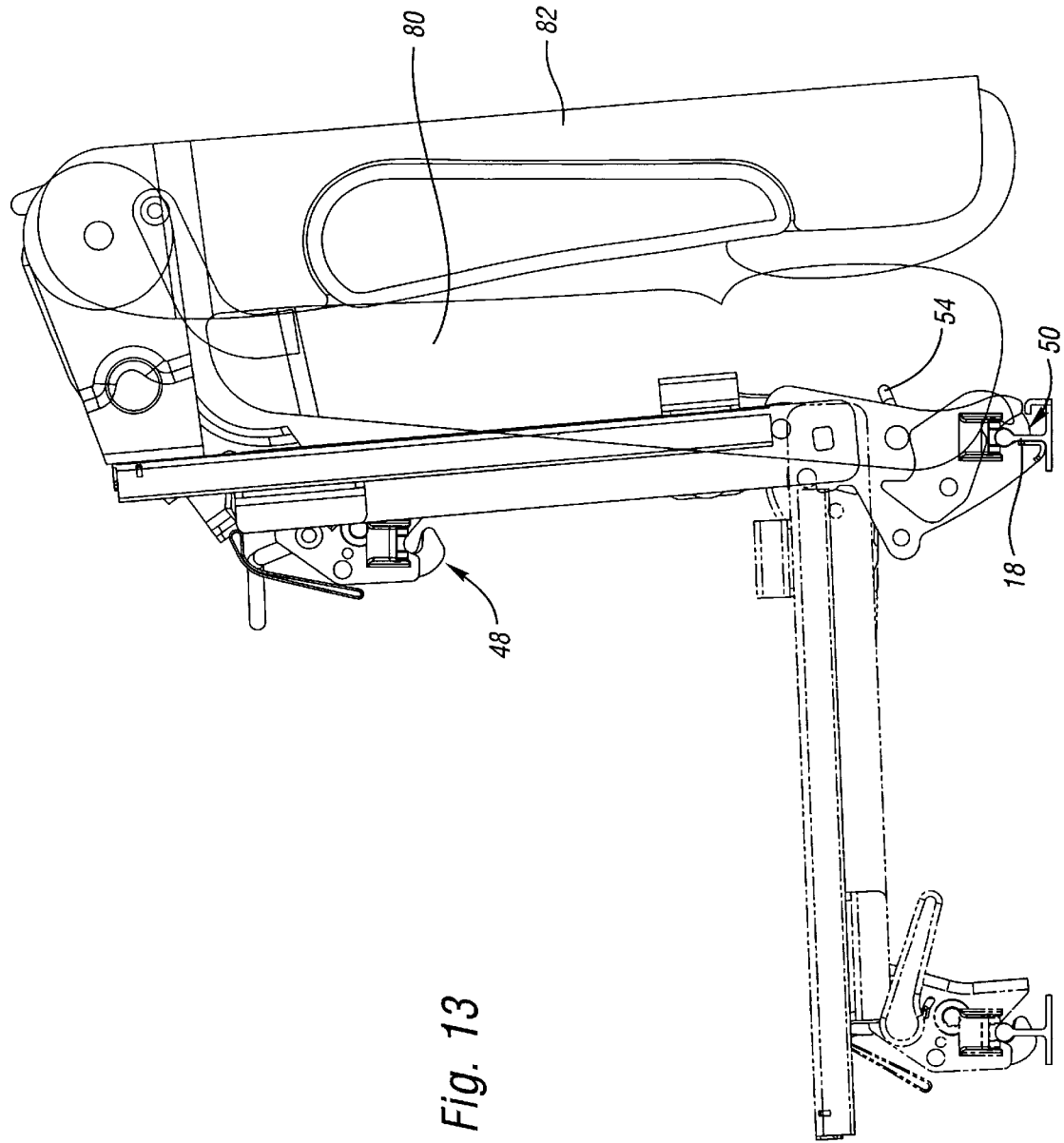
FIG. 13 shows a side view of the seat assembly of FIG. 12 tumbled to a forward position.
Figure 14:
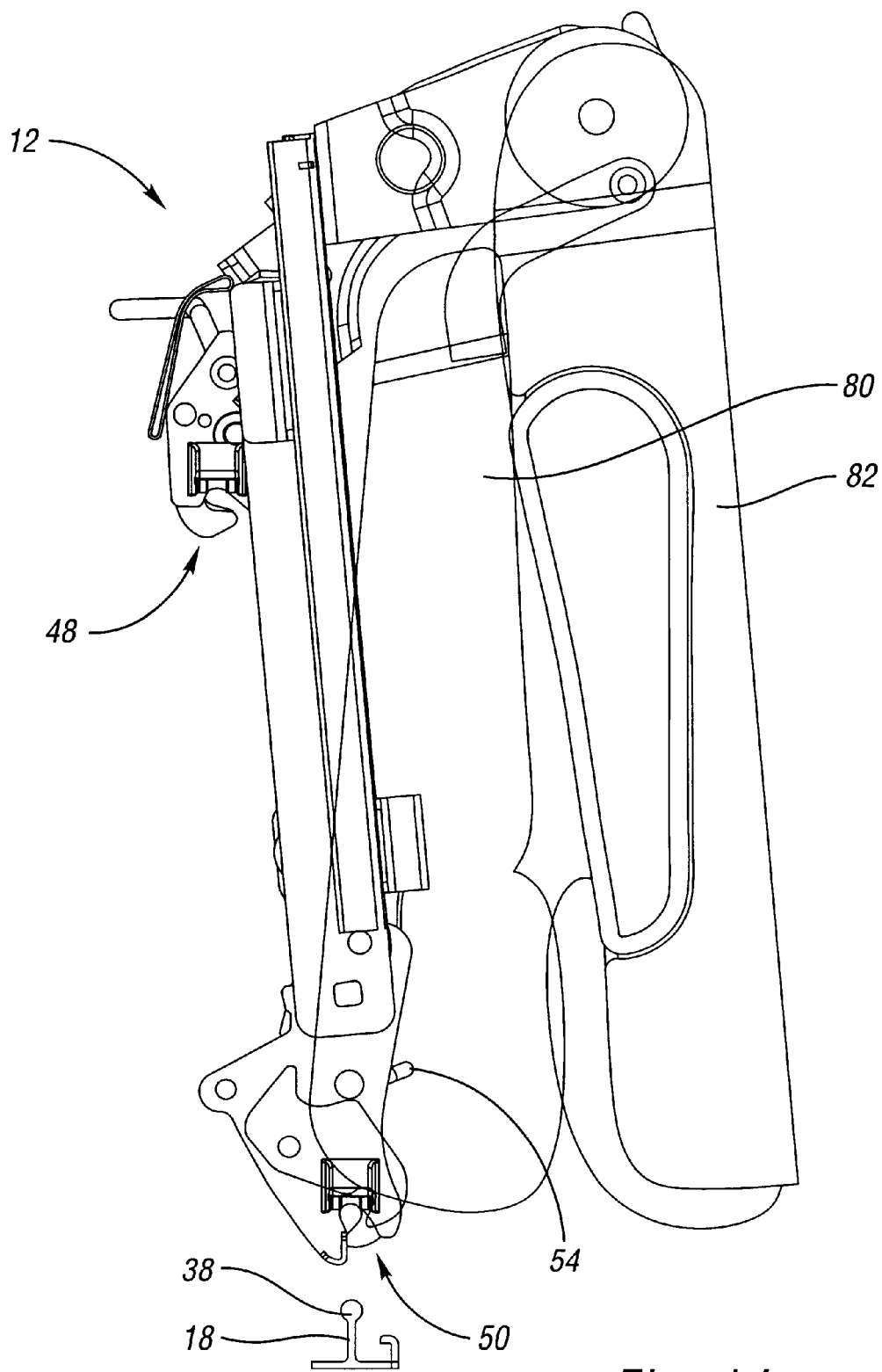
FIG. 14 shows a side view of the seat assembly of FIG. 13 spaced away from the front rail after being removed from (or approaching) the front rail.

When the rear clamping mechanism 48 is released by the single release lever 52, the rear release bar 56, or the rear strap 58, the seat 12 may be tumbled to the upright position shown in FIG. 13. This pivotal movement to the upright, tumbled position is assisted by a pair of large springs 92, 94, shown in FIG. 8. From the tumbled forward, upright position shown in FIG. 13, the seat 12 may be removed from the second rail 18 by pivoting the front release bar 54 to fully retract the hook portion 46 of the front clamping mechanism 50 so that the hook portion 46 may pass over the enlarged portion 38 of the second rail 18 for removal from the rail, as illustrated in FIG. 14. The seat 12 may then be removed from the vehicle, and reattached when needed.

Returning to FIG. 4, first and second plastic trim pieces 96, 98 are supported on the vehicle floor, and the first and second rails 16, 18 protrude through elongated openings 100, 102 in the first and second trim pieces 96, 98. The trim pieces 96, 98, accordingly, surround the first and second rails 16, 18. The first and second rails 16, 18 and the first and second trim pieces 96, 98 are preferably recessed within the vehicle floor to be out of the way for ingress/egress, and storage on the vehicle floor.

The rails 16, 18 are roll-formed and preferably welded or bolted to the underbody floor pan.

Referring to FIG. 6, the upturned edge 104 of the second rail 18 is abuttable against the lower end 106 of the front support 22 to prevent the seat 12 from rotating freely when the seat is tumbled upward for removal.

Accordingly, the laterally sliding seat concept of the invention consists of a seat that has the ability to slide laterally across the vehicle by means of rollers which engage the rails 16, 18 mounted on the underbody floor pan. The clamping mechanisms 48, 50 are releasable so that the seat can be moved along the rails 16, 18. It is intended that the seat be slidable with or without a person seated in the seat, when the vehicle is parked.

Although the invention is illustrated with rectangular apertures 40, 42 formed in the first and second rails 16, 18 for engagement with the rear and front clamping mechanisms 48, 50 in predetermined lateral positions, this device may implement an infinitely adjustable clamping mechanism, such as a compression clamp or other device.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly comprising:
   first and second rails configured for mounting transversely on a vehicle floor parallel to each other;
   a seat having rear and front supports with rollers configured for rolling engagement with the first and second rails, respectively, to facilitate lateral movement of the seat across the rails;
   said rear supports having a releasable rear clamping mechanism engageable with the first rail and releasable from the first rail to enable tumbling of the seat forward in the vehicle;
   said front supports having a releasable front clamping mechanism engageable with the second rail and releasable from the second rail to enable removal of the seat from the vehicle after said tumbling; and
   said seat being laterally movable across the rails when the front and rear clamping mechanisms are simultaneously at least partially released.

2. The vehicle seat assembly of claim 1, wherein said first and second rails have a plurality of apertures formed therethrough and said front and rear clamping mechanisms include hooks releasably engageable with said apertures.

3. The vehicle seat assembly of claim 1, further comprising a single release lever operatively connected to said front and rear clamping mechanisms to facilitate release for lateral sliding movement of the seat.

4. The vehicle seat assembly of claim 3, wherein said second rail includes an enlarged portion engageable with said rollers of the front supports and wherein a linkage is operatively connected between the release lever and said front clamping mechanism, said linkage being configured to partially release said front clamping mechanism sufficiently to enable sliding movement of the seat but not sufficiently to provide clearance for the clamping mechanism to pass over said enlarged portion of the second rail to remove the seat from the rail.

5. The vehicle seat of claim 4, further comprising a front release lever connected to said front clamping mechanism to selectively fully release said front clamping mechanism to enable the front clamping mechanism to pass over said enlarged portion of the second rail to enable removal of the seat from the second rail.

6. The vehicle seat assembly of claim 3, wherein said single release lever is operatively connected to said rear clamping mechanism to selectively fully release said rear clamping mechanism to enable the seat to tumble forward, assisted by a spring.

7. The seat assembly of claim 1, wherein the seat includes a lower seat and a seat back pivotally connected to the lower seat, such that the seat back is pivotable to a folded position on the lower seat.

8. The seat assembly of claim 1, further comprising first and second plastic trim pieces supported on the vehicle floor, wherein the first and second rails protrude through the first and second trim pieces, respectively, and the trim pieces surround the first and second rails.

9. The seat assembly of claim 1, wherein said rollers comprise rubber.

10. The seat assembly of claim 1, further comprising a second seat operatively slidable across said first and second rails.

11. A vehicle seat assembly comprising:
    first and second rails configured for mounting transversely on a vehicle floor parallel to each other, said first and second rails having a plurality of apertures formed therethrough;
    a seat having rear and front supports with rollers configured for rolling engagement with the first and second rails, respectively, to facilitate lateral movement of the seat across the rails;
    said rear supports having a releasable rear clamping mechanism with a hook engageable with the apertures in the first rail and releasable from the apertures in the first rail to enable tumbling of the seat forward in the vehicle;
    said front supports having a releasable front clamping mechanism including a hook engageable with the apertures formed in the second rail and releasable from the apertures formed in the second rail to enable removal of the seat from the vehicle after said tumbling; and
    said seat being laterally movable across the rails by rolling engagement of the rollers with the rails when the front and rear clamping mechanisms are simultaneously at least partially released.

12. The vehicle seat assembly of claim 11, further comprising a single release lever operatively connected to said front and rear clamping mechanisms to facilitate release for lateral sliding movement of the seat.

13. The vehicle seat assembly of claim 12, wherein said second rail includes an enlarged portion engageable with said rollers of the front supports and wherein a linkage is operatively connected between the release lever and said front clamping mechanism, said linkage being configured to partially release said front clamping mechanism sufficiently to enable sliding movement of the seat but not sufficiently to provide clearance for the clamping mechanism to pass over said enlarged portion of the second rail to remove the seat from the rail.

14. The vehicle seat of claim 13, further comprising a front release lever connected to said front clamping mechanism to selectively fully release said front clamping mechanism to enable the front clamping mechanism to pass over said enlarged portion of the second rail to enable removal of the seat from the second rail.

15. The vehicle seat assembly of claim 13, wherein said single release lever is operatively connected to said rear clamping mechanism to selectively fully release said rear clamping mechanism to enable the seat to tumble forward, assisted by a spring.

16. The seat assembly of claim 11, wherein the seat includes a lower seat and a seat back pivotally connected to the lower seat such that the seat back is pivotable to a folded position on the lower seat.

17. The seat assembly of claim 11, further comprising first and second plastic trim pieces supported on the vehicle floor, wherein the first and second rails protrude through the first and second trim pieces, respectively, and the trim pieces surround the first and second rails.

18. The seat assembly of claim 11, wherein said rollers comprise rubber.

19. The seat assembly of claim 11, further comprising a second seat operatively slidable across said first and second rails.

20. A vehicle seat assembly comprising:
   first and second rails configured for mounting transversely on a vehicle floor parallel to each other;
   said first and second rails having a plurality of apertures formed therethrough;
   a seat having front and rear supports with rollers configured for rolling engagement with the first and second rails, respectively, to facilitate lateral movement of the seat across the rails;
   said rear supports having a releasable rear clamping mechanism with a hook engageable with the apertures in the first rail and releasable from the apertures in the first rail to enable tumbling of the seat forward in the vehicle;
   said front supports having a releasable front clamping mechanism including a hook engageable with the apertures formed in the second rail and releasable from the apertures formed in the second rail to enable removal of the seat from the vehicle after said tumbling;
   said seat being laterally movable across the rails by rolling engagement of the rollers with the rails when the front and rear clamping mechanisms are simultaneously at least partially released; and
   a single release lever operatively connected to said front and rear clamping mechanisms to facilitate release for lateral sliding movement of the seat;
   wherein said second rail includes an enlarged portion engageable with said rollers of the front supports, and wherein a linkage is operatively connected between the single release lever and said front clamping mechanism, said linkage being configured to partially release said front clamping mechanism sufficiently to enable sliding movement of the seat but not sufficiently to provide clearance for the clamping mechanism to pass over said enlarged portion of the second rail to remove the seat from the rail.

21. The vehicle seat of claim 20, further comprising a front release lever connected to said front clamping mechanism to selectively fully release said front clamping mechanism to enable the front clamping mechanism to pass over said enlarged portion of the second rail to enable removal of the seat from the second rail.

22. A vehicle seat assembly including a seatback pivotable with respect to a lower seat which is supported by rollers on first and second rails positioned on a vehicle floor, wherein the seatback is foldable against the lower seat, the seat is releasably clamped to the first rail for removal and tumbling to a forward vertical position, the seat is releasably clamped to the second rail for selective unclamping to remove the seat from the vehicle, and the seat is releasably clamped to the first and second rails to enable selective rolling movement of the rollers across the rails to facilitate lateral adjustment of the seat along the rails in the vehicle.

* * * * *